Patented Jan. 10, 1933

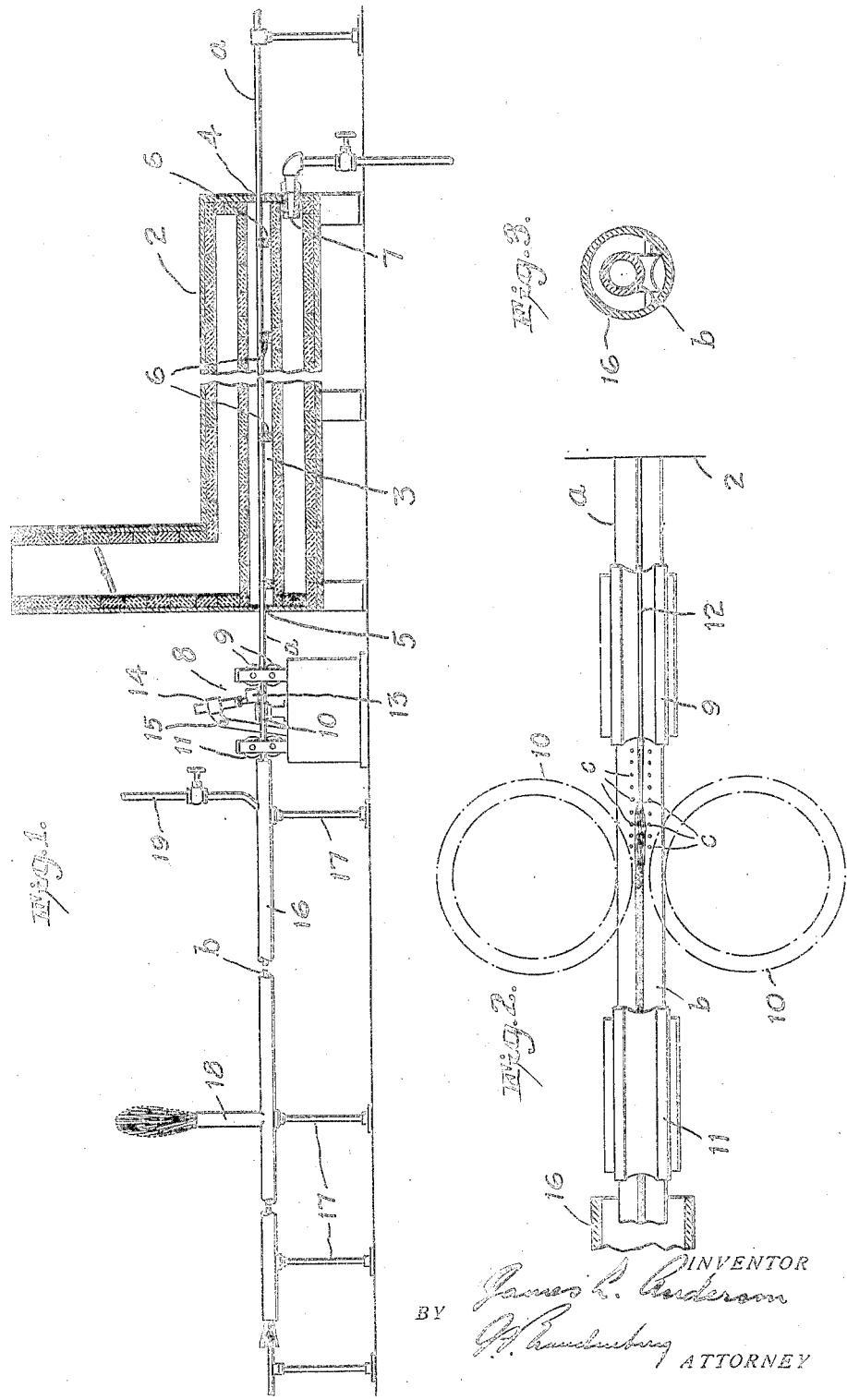

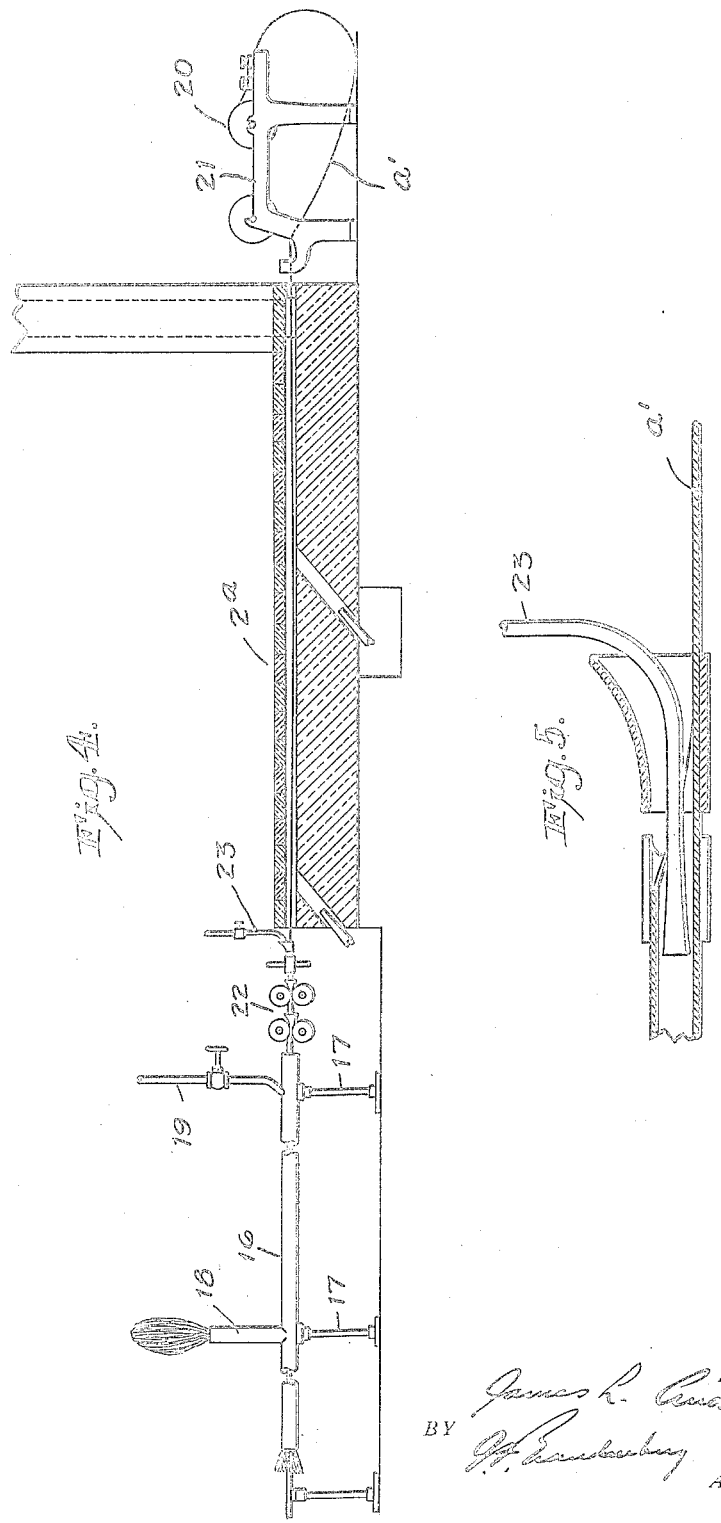

1,893,926

UNITED STATES PATENT OFFICE

JAMES L. ANDERSON, OF TENAFLY, NEW JERSEY, ASSIGNOR TO AIR REDUCTION COMPANY, INCORPORATED, OF NEW YORK, N. Y., A CORPORATION OF NEW YORK

PRODUCTION OF SCALE-FREE WELDED TUBING

Application filed December 10, 1928. Serial No. 325,094.

The invention relates to the manufacture of welded steel pipe and tubing, and the object is to produce welded tubing which is free, or substantially free, from scale and/or oxide on the inner surface, or the outer surface, or both, and this with very little additional expense or difficulty.

Scale has heretofore been removed by separate operations after the tubing was made, the cleaning of the surfaces being necessary whenever they are to be finished by enameling, galvanizing or otherwise, and, in the case of tubing used for the transmission of fluids, being particularly important on the inside. The methods have included tumbling, for the outer surface, pickling for the outer and inner surfaces, and bending, to free the scale on the inside. These are not only extra operations, but as far as the inside surface is concerned, are only partially effective.

According to this invention, scale and oxide are removed from the surfaces in connection with the making of the welded tubing, or while it is traveling lengthwise away from the welding region.

The invention has to do more particularly with welding methods wherein the skelp or tube blanks are strongly heated in a furnace preparatory to welding. Scale and oxide may be present on the skelp or blanks before they are put in the furnace, or may result from an oxidizing atmosphere in the furnace, or in any event would be caused by oxidation in the air when the highly heated blanks are taken from the furnace. The heat put into the metal in the furnace may be an essential factor for the welding, or it may serve to assist or speed up the welding or to effect economy in welding. For scale removal, the invention makes use of this heat for the purpose of a deoxidizing reaction which cleans the surface, or surfaces, of the tube, this reaction being obtained by means of a reducing gas or mixture of gases supplied in sufficient quantity, and suitably confined or conducted in contact with the inner surface or the outer surface of the hot tube, or both, for a sufficient length of time, to accomplish the result. For the purpose of preventing the formation of scale and oxide, or for preventing reoxidation, the invention involves keeping the welded tube in contact with the reducing gas long enough to allow the metal to cool down below the point at which oxidation, or injurious oxidation, will occur through the action of the oxygen of the air.

Heavy-walled welded pipe and tubing are commonly made by heating the skelp in a furnace to or somewhat above a point which will enable the edges to be united under pressure. In the draw-bench method, heated flat or bent skelp is drawn through a bell, thereby forming the tube and closing the edges together. It is also known to form and/or weld the tube between driven rolls, in which event the skelp may be of indefinite length and may be withdrawn from a reel in or back of the furnace. Tubing may also be produced from pre-formed, unclosed lengths of tube, heated in a furnace and then passed through rolls the pressure of which forces the edges together. In such methods, the metal, instead of being heated in the furnace sufficiently to bring the edges to the pressure welding state, may be heated to a lower point, and air or oxygen may be blown on the edges just before they are forced together so as to bring them to the welding condition by burning a little of the material. Pipe made in any of these ways is badly oxidized, and the scale on the inside can not be thoroughly or satisfactorily removed by the ordinary methods of scale removal.

To overcome this difficulty, I propose to pass a reducing gas, such as city illuminating gas, hydrogen, carbon monoxide, or other gases rich in reducing agents, through the interior of the pipe, either in the direction in which it is moving or in the reverse direction, or in both directions, or in the two directions alternately. This can be accomplished by directing a stream of the gas into the hot tube at a point where it is still unclosed and causing it to flow through the traveling tube for a long enough distance beyond the station where the welding takes place so that the tube will have time to cool down while protected by the gas. If the tube is in long enough lengths, or if the successive lengths are in close enough end to end abutment or are tacked together so as to afford a conduit without too much leakage between the ends, and if the supply of reducing gas is ample enough, the inside surface will be deoxidized and protected from reoxidation throughout the length of the several tubes, without leaving a rear portion, or much of the length at the rear end, which is either insufficiently deoxidized or subject to reoxidation after passing the point where the gas is introduced. Likewise, if the tube is formed and welded from a strip of indefinite length, the rear end of which may be welded to the leading end of another strip, and so on throughout the run, and if the welded tube is not cut off into lengths until it has proceeded far enough beyond the welding station for the metal to cool below the oxidizing temperature, it is sufficient, so far as the interior surface is concerned, to introduce the reducing gas at the rear to flow forward through the tube, since it will be only the final portion of tubing which may not be thoroughly deoxidized on the inside.

The deoxidation of the inside of the tube and the prevention of reoxidation therein may also be accomplished by causing the tube, after it has been welded, to travel onward through a long chamber or jacket to which reducing gas is constantly supplied, gas from this chamber being first caused to enter the forward end of each tube length to pass rearward therein, and afterwards to enter the rear end of each welded length and flow through it in the forward direction. Again, utilizing such a chamber, the disposition may be such that there will be little passage of gas rearwardly through the forward end of each tube, but an ample flow through the rear ends forwardly.

A combination of admission of gas to the interior of the tube at a point behind the welding station and admission through the forward and/or rear ends beyond the welding station may be employed.

The reducing gas inside such a long chamber or jacket surrounding the traveling tube will serve to deoxidize the outside surface of the tube. For this purpose, the enclosure should be of considerable length, and it should be kept properly supplied with fresh gas, so that the outside of the tube will not pass beyond the reducing atmosphere until sufficient cooling takes place. The gas itself serves in some measure as a cooling medium.

According to another form of execution of the invention, applicable more especially to the production of butt-welded tubing, the edges of the seam are welded by, or by aid of the oxyacetylene flame, or other high-temperature oxy-fuel-gas flame, and the skelp strip, or the pre-formed tubular blanks, are first highly heated by means of a furnace, in order to increase the linear speed of welding, to minimize loss through conduction of heat put into the metal by the flame jets to reduce the consumption of gases supplying these jets, and/or to improve the welds obtained. The high temperature flame applied to the edges or to the metal slightly back of the edges at each side of the seam, is preferably employed to melt these regions so that they flow together in an autogenous melt weld. However, though less desirably, this heat might be applied to the edges where they are still separated to soften them or bring them only to surface fusion, after which the edges might be forced and welded together by pressure.

In tube welding operations employing the oxyacetylene or similar flame and adequate furnace pre-heat, the deoxidation and protection of the surface or surfaces of the tube may be accomplished in the ways which have already been indicated. In such cases, however, a special reducing gas need not necessarily be supplied to the interior of the hot tube, since the oxyacetylene flame possesses an envelope consisting of hydrogen and carbon monoxide, which ordinarily burn in the oxygen of the air. These envelope gases, and particularly the hydrogen thereof, can be utilized for deoxidation of the inner surface of the tube by causing a sufficient quantity thereof to enter through the open seam unconsumed. To this end, a considerable number of fine flame jets should be employed close enough together to shield a considerable part of the envelope gases from atmospheric oxygen. The smallness of the jets may be a factor in this connection, since they entrain less air than do large jets. Preferably, the jets are grouped in two transversely spaced rows, as in my Patents 1,402,996, 1,402,997 and 1,516,486, or in some equivalent arrangement, so that a considerable proportion of the envelope gases will not be able to obtain oxygen from the air and so that an ample supply of these gases, unconsumed or only partially consumed, will be blown through the open seam into the tube, where they will flow throughout the length seeking an exit.

In practicing tube welding under my aforesaid patents, without furnace preheating, it was observed that the inside line of the seam came out bright, due to the reducing action of the gases. The interior as a whole, however, was not deoxidized, owing to the fact that the temperature of the metal diminished very sharply at a short distance at each side of the center line of the weld. By putting into the body of the metal in a furnace a comparatively high degree of preheat it becomes possible not only to secure important advantages with respect to the welding but also to produce pipe and tube which is free of scale and oxide over the complete circuit of the inner surface.

In the accompanying drawings:

Fig. 1 is a view partly in side elevation and partly in section, broken out at intervals in the length of the view, illustrating a form of execution of the invention wherein the tubing is welded by or by aid of an oxyacetylene torch;

Fig. 2 is a plan view on a larger scale of a portion of Fig. 1 including the welding region;

Fig. 3 is a cross-section through the welded tube and an enclosure through which reducing gas is passed;

Fig. 4 is a view similar to Fig. 1 illustrating another form of execution of the invention; and Fig. 5 is a vertical section on a larger scale of a portion of Fig. 4, illustrating the manner in which reducing gas may be introduced into the interior of a tube which is welded by pressure.

Figs. 1 to 3 will now be described.

The numeral 2 designates a long furnace which is preferably employed, this furnace containing a chamber 3 of relatively small cross-section, having small openings 4 and 5 at opposite ends for the passage of the skelp $a$, which is preferably in the form of pre-formed open-seam tubing in long lengths of fifty feet or more. The furnace may be either of the muffle type or of the direct heating type. The chamber 3 is provided with guides 6, so that the unclosed tube lengths can be passed through the furnace one immediately following another, the skelp or blanks being moved by and or by mechanism comparatively rapidly, the speed, in relation to the length of the furnace, being such that each portion along the length of the skelp becomes heated to the desired comparatively high temperature before it emerges from the opening 5. The furnace may be fired by either gas or oil, a gas burner being indicated at 7.

The invention is not necessarily limited to the use of pre-formed blanks, since it is common practice to operate on flat skelp and to form and weld the pipe or tube on leaving the furnace.

In the particular case illustrated the pre-formed blanks pass in succession from the furnace to an oxyacetylene welding machine 8 located close in front of the furnace, this machine having three pairs of rolls 9, 10 and 11 by which the tube is driven forward, the first pair of rolls 9 being guide rolls, the upper of which is provided with a thin guide fin 12 which enters the open seam, the second pair of rolls 10 being holding rolls adapted to apply moderate transverse compression to the tube at a point where it has been freshly welded, and the third pair of rolls 11 being sizing rolls.

Close behind the rolls 10, that is to say at the side toward the furnace, from which the material is advancing, and directly over the seam, there is the tip 13 of a multiple jet oxyacetylene or equivalent welding torch 14, which is supported on a suitable bracket 15.

This torch is preferably designed to deliver a group of high temperature flame jets $c$, extended for a distance lengthwise of the seam and also spread transversely, preferably in two rows, so that the jets are directed against the metal a short distance away from the edges of the tube, at opposite sides of the seam, as in my patents aforesaid.

The metal of the edges and adjacent portions of the tube are fused largely by indirect or radiant heat and flow together. Each freshly welded portion of the tube then passes between the bite of the rolls 10, which compress the still plastic metal of the weld sufficiently to bring it substantially up to the contour of the tube. The welded tube $b$ then proceeds through the sizing rolls 11.

The manner of making the weld and the type of weld, may, however, be varied.

In the space between the rows of high-temperature flame jets the oxygen of the air has little access to the envelope gases rich in hydrogen and these gases are caused to enter through the open seam adjacent the welding point and to fill the interior, flowing inside the tube to the far end of the welded tube, and also passing in the reverse direction toward the furnace. Air being practically excluded from the interior of the tube, combustion of this deoxidizing gas remains very incomplete, and the gas acts on the inner surface of the highly heated tube to remove all scale and oxid, and/or to prevent the oxidation and scaling which would otherwise take place as the result of the oxygen of the air attacking the heated metal.

The welded tube or pipe must be allowed to proceed in contact with the deoxidizing gas for a sufficiently long distance beyond the welding point to give the deoxidizing gas time to act, and to permit the tube to cool down to a temperature below that at which oxidation will occur in the air, before the tube is cut to shorter lengths.

I prefer to heat the metal in the furnace above a bright red heat. In any event, the invention contemplates preheating the whole tube or blank sufficiently to develop the deoxidizing effect of the reducing gas.

In order to deoxidize the outside of the tube, I provide a long jacket 16 suitably supported on stands 17 so that the welded tube is caused to enter it immediately on leaving the rolls 11, that is to say as near the welding point as may be, and I arrange for a stream of deoxidizing gas to flow continually through this jacket in contact with the entire outer surface of the tube. This jacket is of such considerable length that each portion of the welded tube cools down below the oxidizing point before it leaves the far end of the jacket. The gas employed for deoxidizing the outer surface may be illuminating gas supplied through a valved pipe 19 connected with the city gas piping system, or reducing gas from any other suitable source that may be available at moderate expense.

This gas passes out from the far end of the jacket, where it may be burned, and it may also be taken off at an intermediate point through a pipe 18.

Figs. 4 and 5 illustrate a plan of the invention in which the edges of the tube are welded together by pressure. Flat skelp strip a' of indefinite length is supplied from a reel 20 and drawn through a long furnace 2ª. A reel stand 21 may be provided for holding two or more reels, so that when one reel is exhausted the end of the strip of another reel may be welded to the rear of each strip in transit through the furnace.

In front of the furnace there is a forming, welding and sizing mill 22, which is schematically represented.

A pipe 23 connected with a city gas system or with any other source of supply of reducing gas is arranged to direct a stream of such gas into the tube just behind the region where it is formed and welded and to cause this gas to fill and flow through the conduit formed by the welded tube, to the far end thereof. In order to avoid cooling the metal where it is welded, this pipe or nozzle may extend inside the tube for a distance beyond the place where the weld is made.

The welded tube enters and passes through a long jacket 16 supplied with reducing gas, by a pipe 19, as in the other case.

I claim:

1. The method of producing welded tubing free of scale on the inside which comprises heating the material in a furnace above a bright red heat, moving the material lengthwise and progressively welding the seam, and simultaneously introducing reducing gas into the interior of the heated tubing so as to deoxidize the entire inner surface, and continuing to introduce said gas so that said surface is protected until it cools down below the oxidizing point.

2. The method of producing welded tubing free of scale on the inside which comprises heating the material in a furnace above a bright red heat, moving the material lengthwise and progressively welding the seam, simultaneously introducing reducing gas from the rear into the interior of the heated tubing so as to deoxidize the entire inner surface, and continuing to introduce said gas so that said surface is protected until it cools down below the oxidizing point.

3. The method of producing welded tubing which comprises heating the material in a furnace to a relatively high temperature, moving the material lengthwise and progressively welding the seam, and passing the hot welded tubing in its onward course through a long enclosure which is supplied with reducing gas.

4. The method of producing scale-free welded tubing which comprises heating the material in a furnace to a relatively high temperature, moving the material lengthwise and progressively welding the seam, passing the hot welded tubing in its onward course through a long enclosure which is supplied with reducing gas, and separately introducing reducing gas into the interior of the tubing.

5. The method of producing scale-free welded tubing which comprises heating the material in a furnace to a relatively high temperature, moving the material lengthwise and progressively welding the seam, passing the hot welded tubing in its onward course through a long enclosure which is supplied with reducing gas, and introducing reducing gas from the rear into the interior of the tubing.

6. The method of making welded tubing, which comprises heating the material to an elevated temperature in a furnace, withdrawing it from the furnace and progressively welding the edges together, introducing reducing gas into the interior of the tube at a region where the tube is unclosed and causing it to fill and flow through the tube to deoxidize the entire interior surface, and continuing to introduce said gas so that said surface is protected until it cools down below the oxidizing point.

7. The method of making welded tubing, which comprises heating the material to an elevated temperature in a furnace, withdrawing it from the furnace and progressively welding the edges together, introducing reducing gas into the interior of the tube at a region between the furnace and the welding region and causing it to fill and flow through the tube to deoxidize the entire interior surface, and continuing to introduce said gas so that said surface is protected until it cools down below the oxidizing point.

8. Method of making welded tubing, which comprises pre-heating the material to an elevated temperature, moving the material and the welded tubing longitudinally, progressively welding the edges together while projecting against the metal at opposite sides of the cleft a group of fine high temperature flame jets having envelopes rich in reducing gas, causing unconsumed gases of the envelope to enter, fill and flow through the tube while it is highly heated to deoxidize the entire inner surface of the tube, and continuing to introduce said gases so that said surface is protected until it cools down below the oxidizing point.

9. Method of making welded tubing, which comprises pre-heating the material to an elevated temperature, moving the material and the welded tubing longitudinally, progressively melting the edges and adjacent metal and causing them to flow together under the application of a group of fine high temperature flame jets having envelopes rich in reducing gas, causing unconsumed gases of the envelope to enter, fill and flow through the tube while it is highly heated to deoxidize the entire inner surface of the tube, and continuing to introduce said gases so that said surface is protected until it cools down below the oxidizing point.

10. Improvement in the making of welded tubing wherein the material is heated to an elevated temperature in a furnace preparatory to being welded while in longitudinal motion, characterized in that the heated tubing shortly after it emerges from the furnace and for a long distance is caused to be surrounded by a gaseous reducing medium to deoxidize and protect the surface.

11. Improvement in the making of welded tubing wherein the material is heated to an elevated temperature in a furnace preparatory to being welded while in longitudinal motion, characterized in that the heated tubing shortly after it passes the welding region and for a long distance is caused to be surrounded by a gaseous reducing medium to deoxidize and protect the surface.

12. Improvement in the making of welded tubing wherein the material is heated to an elevated temperature in a furnace preparatory to being welded while in longitudinal motion, characterized in that the heated tubing shortly after it emerges from the furnace is subjected for a considerable distance to the action of reducing gas both outside and inside to deoxidize and protect the surfaces.

JAMES L. ANDERSON.